US012431966B2

(12) United States Patent
Fujimoto et al.

(10) Patent No.: US 12,431,966 B2
(45) Date of Patent: Sep. 30, 2025

(54) SATELLITE CONSTELLATION APPARATUS, SATELLITE CONSTELLATION SYSTEM, METHOD, AND NON-TRANSITORY COMPUTER-READABLE MEDIUM

(71) Applicant: NEC Corporation, Tokyo (JP)

(72) Inventors: Go Fujimoto, Tokyo (JP); Yusuke Yokota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 403 days.

(21) Appl. No.: 18/119,623

(22) Filed: Mar. 9, 2023

(65) Prior Publication Data
US 2024/0178909 A1 May 30, 2024

(30) Foreign Application Priority Data

Nov. 29, 2022 (JP) ................. 2022-190023

(51) Int. Cl.
H04B 7/185 (2006.01)
(52) U.S. Cl.
CPC ................ H04B 7/18513 (2013.01)
(58) Field of Classification Search
CPC ............ H04B 7/18513; H04B 7/18519; H04B 7/18521
See application file for complete search history.

(56) References Cited

U.S. PATENT DOCUMENTS

| | | | | |
|---|---|---|---|---|
| 6,157,621 A | * | 12/2000 | Brown | H01Q 25/008 370/310 |
| 7,158,053 B2 | * | 1/2007 | Crank | B64D 45/0031 340/963 |
| 2019/0253134 A1 | * | 8/2019 | Coleman | H04B 7/18519 |

FOREIGN PATENT DOCUMENTS

WO 2017/175696 A1 10/2017

OTHER PUBLICATIONS

Ruiz-De-Azua, Joan A., et al. "Assessment of satellite contacts using predictive algorithms for autonomous satellite networks." IEEE access 8 (2020): 100732-100748. (Year: 2020).*

* cited by examiner

Primary Examiner — Sharad Rampuria
(74) Attorney, Agent, or Firm — Sughrue Mion, PLLC

(57) ABSTRACT

A satellite constellation apparatus, a satellite constellation system, a method, and a non-transitory computer-readable medium that can prevent instantaneous interruption of communication are provided. A traffic control ground station is capable of communicating with a plurality of satellites and includes a communication control unit configured to predict a functional link through the plurality of satellites at a time point later than the present time point by a predetermined time based on trajectories of the plurality of satellites and control switching of transmission destinations of communication data transmitted and received by the satellites so that communication is performed by using the predicted functional link before a functional link through the plurality of satellites at the present time point is disconnected at the time point later by the predetermined time.

13 Claims, 14 Drawing Sheets

SATELLITE CONSTELLATION APPARATUS, SATELLITE CONSTELLATION SYSTEM, METHOD, AND NON-TRANSITORY COMPUTER-READABLE MEDIUM

INCORPORATION BY REFERENCE

This application is based upon and claims the benefit of priority from Japanese patent application No. 2022-190023, filed on Nov. 29, 2022, the disclosure of which is incorporated herein in its entirety by reference.

TECHNICAL FIELD

The present disclosure relates to a satellite constellation apparatus, a satellite constellation system, a method, and a non-transitory computer-readable medium.

BACKGROUND ART

Recently, a satellite communication system including a plurality of satellites orbiting on low earth orbit (LEO) has been developed. Such an LEO satellite communication system is a non-terrestrial network (NTN) and can provide a communication means at a place where communication is impossible on the Earth, for example, on the ocean or a land where infrastructures cannot be installed. The LEO satellite communication system has been attracting attention as a communication means replacing a physical cable such as a submarine cable for intercontinental communication. The LEO satellite communication system is expected as an alternative means when a terrestrial network is disconnected for some reason.

LEO has an altitude lower than that of geostationary earth orbit (GEO), and thus an area coverable by one satellite orbiting on LEO is smaller than that of one satellite orbiting on GEO. Thus, the LEO satellite communication system includes an extremely large number, several hundreds to several tens of thousands, of small-sized satellites. Thus, the plurality of satellites need to be controlled to perform cooperative operation in the LEO satellite communication system.

WO 2017/175696 discloses an LEO satellite system in which the surface of the ground is divided into a large number of regions (grids), a region handling satellite is allocated to each region, and each region handling satellite manages any terminal apparatus existing in the corresponding region. In the LEO satellite system of WO 2017/175696, each region handling satellite switches places with another satellite from moment to moment along with change of the relative position of the LEO satellite with respect to the Earth. Accordingly, constant management is achieved.

In the LEO satellite communication system, a functional communication path (hereinafter also referred to as "link") through the satellites and a functional link between each satellite and a ground station (also referred to as an "earth station") frequently change from moment to moment along with relative movement of the satellites with respect to the surface of the ground. To prevent instantaneous interruption of communication, it is needed to determine which link is to be used to perform communication in accordance with change of the functional link through the satellites and the functional link between each satellite and the ground station.

SUMMARY

The present disclosure is intended to provide a satellite constellation apparatus, a satellite constellation system, a method, and a non-transitory computer-readable medium that can prevent instantaneous interruption of communication.

A satellite constellation apparatus according to the present disclosure is a satellite constellation apparatus capable of communicating with a plurality of satellites and includes a traffic control communication control unit configured to predict a functional link through the plurality of satellites at a time point later than the present time point by a predetermined time based on trajectories of the plurality of satellites and control switching of transmission destinations of communication data transmitted and received by the satellites so that communication is performed by using the predicted functional link before a functional link through the plurality of satellites at the present time point is disconnected at the time point later by the predetermined time.

A satellite constellation system according to the present disclosure includes a plurality of satellites and a satellite constellation apparatus capable of communicating with the plurality of satellites, and the satellite constellation apparatus includes a traffic control communication control unit configured to predict a functional link through the plurality of satellites at a time point later than the present time point by a predetermined time based on trajectories of the plurality of satellites and control switching of transmission destinations of communication data transmitted and received by the satellites so that communication is performed by using the predicted functional link before a functional link through the plurality of satellites at the present time point is disconnected at the time point later by the predetermined time.

A method according to the present disclosure is a method by which a satellite constellation apparatus capable of communicating with a plurality of satellites predicts a functional link through the plurality of satellites at a time point later than the present time point by a predetermined time based on trajectories of the plurality of satellites and controls switching of transmission destinations of communication data transmitted and received by the satellites so that communication is performed by using the predicted functional link before a functional link through the plurality of satellites at the present time point is disconnected at the time point later by the predetermined time.

A non-transitory computer-readable medium according to the present disclosure stores a program configured to cause a satellite constellation apparatus capable of communicating with a plurality of satellites to execute processing of predicting a functional link through the plurality of satellites at a time point later than the present time point by a predetermined time based on trajectories of the plurality of satellites and controlling switching of transmission destinations of communication data transmitted and received by the satellites so that communication is performed by using the predicted functional link before a functional link through the plurality of satellites at the present time point is disconnected at the time point later by the predetermined time.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

First Example Embodiment

Figure 1:
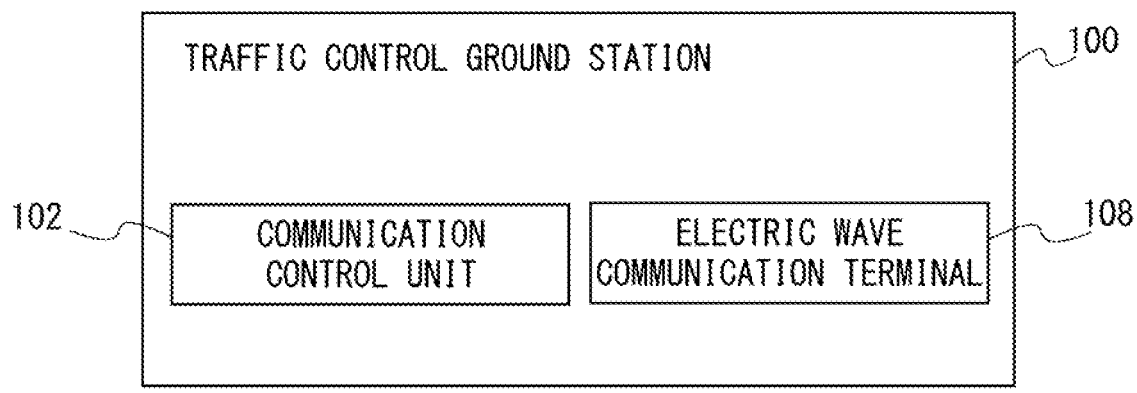
FIG. 1 is a block diagram illustrating an example of the configuration of a traffic control ground station according to a first example embodiment.

FIG. 1 is a block diagram illustrating the configuration of a traffic control ground station 100 as a satellite constellation apparatus according to an first example embodiment.

In a satellite communication system (hereinafter referred to as an "LEO satellite communication system") including a plurality of satellites orbiting on LEO, the traffic control ground station 100 in the first example embodiment determines which link is to be used to perform communication in accordance with change of a link through the satellites or a link between each satellite and a ground station. A link means a communication path among satellites or a communication path between a satellite and a ground station. Specifically, a link means a communication path connecting lower-level layers (the physical layer and the data link layer of the OSI reference model) between satellites or between a satellite and a ground station. Communication paths are routed in a mesh around the Earth. Ground stations include a user ground station in addition to the traffic control ground station 100. Thus, the traffic control ground station 100 determines an end-to-end (E-to-E) path indicating satellites through which communication is to be performed between a user ground station and another user ground station positioned at another place.

Since an area coverable by one satellite orbiting on LEO is smaller than that of one satellite orbiting on GEO, the LEO satellite communication system includes an extremely large number, several hundreds to several tens of thousands, of small-sized satellites. Since communication paths are formed in a mesh, a large number of link candidates are selected for communication from among links through satellites or links between a satellite and a ground station. These links change from moment to moment along with relative movement of the satellites with respect to the surface of the ground.

It is assumed that each satellite includes three or more optical communication terminals. For example, when one satellite communicates with other satellites positioned in north, south, east, and west, respectively, it is assumed that the one satellite includes four or more optical communication terminals. Furthermore, since each satellite also communicates with a ground station, it is assumed that the satellite includes a radio-frequency antenna or an optical communication terminal in addition to the optical communication terminals used for communication with the other satellites.

In such an LEO satellite communication system, it is assumed that a link is switched at least once in a dozen seconds to provide a functional communication service. Moreover, it is needed to be compatible with link switching once in several seconds when future scale increase, dual use, sunlight influence, circumpolar communication constraint, and the like are considered.

It is possible to perform large-volume communication of several Gbps or higher by using optical communication between satellites. Thus, it is assumed that communication cut-off only for an extremely short duration provides significant influence. Furthermore, since a large number of links exist between satellites on communication paths globally formed in a mesh, packet looping potentially occurs and crashes the LEO satellite communication system.

With discussion, for example, a case in which each satellite is regarded as a router and a case in which each satellite is regarded as an L2 switch/bridge are thought of as a transfer scheme between satellites when a conventional network configuration is simply applied to the LEO satellite communication system. When each satellite is regarded as a router, it is assumed to use a routing protocol such as Border Gateway Protocol (BGP), which is an exterior gateway protocol (EGP) for a fixed network, or Open Shortest Path First (OSPF), which is an IFP (Internet Filtering Protocol). Such a transfer scheme is a scheme in which a path is fixedly set in advance or a scheme in which path information is exchanged between routers.

However, in these schemes, it is assumed that a link is established through a fixed wired network and any adjacent instrument at a link destination is fixed. These schemes have a function to change a path upon detection of communication failure or the like but do not assume path change in advance. Furthermore, it is not assumed for a conventional fixed network that links frequently change, and it is not assumed that when reestablished, a link is connected to an instrument different from that previously connected. Thus, it is supposed to be difficult to handle an explosively increased amount of path information exchanged between satellites as routers and to transfer path information to every router in a short duration and establish a stable path.

IP address management is simple when each satellite is regarded as an L2 switch/bridge in an inter-satellite transfer scheme. However, a loop configuration occurs everywhere when each satellite is regarded as an L2 switch/bridge. When broadcast occurs in Address Resolution Protocol (ARP) or the like, broadcast storm in which communication is substantially impossible due to loops occurs at various places in a case of a normal L2 switch/bridge. Furthermore, each time broadcast occurs, influence thereof propagates to all satellites, which is a large waste. To avoid this problem, all communication paths need to be fixed.

A mobile multi-hop routing protocol can be employed as an inter-satellite transfer scheme. The scheme is roughly categorized as a reactive type or a proactive type. The reactive type is a scheme that forms a path after communication to be transferred is started. The proactive type is a scheme that forms a path in advance, and has an advantage that communication to be transferred can be immediately started. However, it is difficult to switch paths without cutting off communication to be transferred while the communication is continuously performed.

When large-volume communication is handled, in particular, it is assumed that communication cutoff in a moment has large influence. In a case of Transmission Control Protocol (TCP) communication, communication speed potentially halves due to a loss of a large number of packets to be transferred. In a case of User Datagram Protocol (UDP) communication, a loss of a large number of packets to be transferred occurs and packets do not reach an application.

To solve such problems, the traffic control ground station 100 in the first example embodiment predicts the positions (relative positions with respect to a predetermined position on the ground) of a plurality of satellites by trajectory calculation and predicts a functional link through the plurality of satellites at a time point later than the present time point by a predetermined time based on the predicted positions of the plurality of satellites. To prevent instantaneous interruption of communication, the traffic control ground station 100 determines which link is to be used to perform communication in accordance with change of the functional link through the satellites or a functional link between any satellite and a ground station. The traffic control ground station 100 also determines, separately for each of C-plane and U-plane, which link is to be used, in other words, through which satellites communication is to be performed. Specifically, as illustrated in FIG. 1, the traffic control ground station 100 includes a communication control unit 102 as a traffic control communication control unit and a radio-frequency communication terminal 108. The traffic control ground station 100 is capable of communicating with the plurality of satellites included in an LEO satellite communication system.

Figure 2:
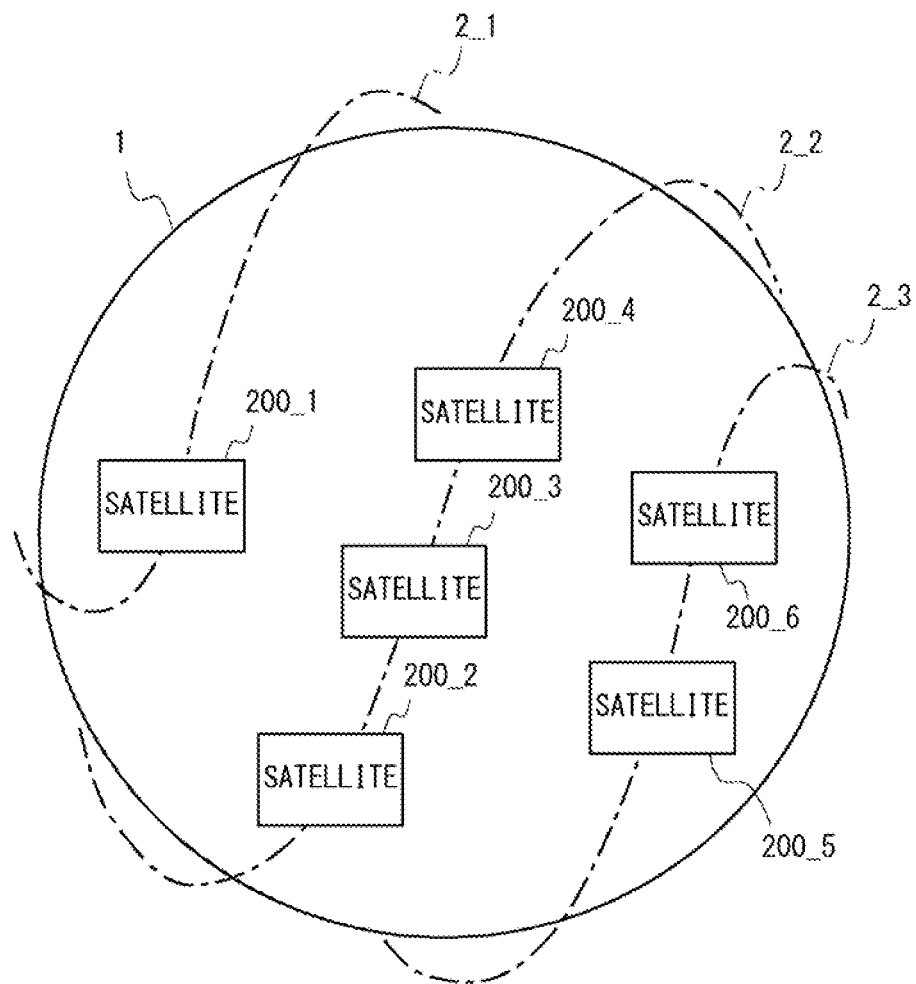
FIG. 2 is a schematic diagram illustrating satellites orbiting on LEO.

The communication control unit 102 predicts a functional link through the plurality of satellites at a time point later than the present time point by a predetermined time based on the trajectories of the plurality of satellites included in the LEO satellite communication system. FIG. 2 schematically illustrates satellites orbiting on LEO. In the example illustrated in FIG. 2, there are trajectories 2_1, 2_2, and 2_3 around Earth 1. The LEO satellite communication system includes a satellite 200_1 orbiting on the trajectory 2_1, satellites 200_2, 200_3, and 200_4 orbiting on the trajectory 2_2, and satellites 200_5 and 200_6 orbiting on the trajectory 2_3. In the present specification, the trajectories 2_1, 2_2, and 2_3 are simply referred to as trajectories 2 when not distinguished from one another. In the present specification, the satellites 200_1 to 200_6 are simply referred to as satellites 200 when not distinguished from one another. In the present specification, the number of trajectories on which the satellites 200 included in the LEO satellite communication system are orbiting is not limited to the number of illustrations. In the present specification, the number of satellites 200 orbiting on each trajectory 2 is not limited to the number of illustrations. In other words, the number of satellites 200 included in the LEO satellite communication system is not limited to the number of illustrations.

The trajectory 2 of each satellite 200 is normally patterned. Thus, the position of each satellite 200 at a time point can be predicted by trajectory calculation. The trajectory calculation may use a known trajectory calculation method. Since the positions of the plurality of satellites 200 at a time point can be predicted, a functional link through the plurality of satellites 200 at a time point later than the present time point by a predetermined time can be predicted. Thus, the communication control unit 102 performs link simulation to predict the functional link through the plurality of satellites 200 at the time point later than the present time point by the predetermined time. Specifically, the communication control unit 102 predicts the functional link through the plurality of satellites 200 at the time point later than the present time point by the predetermined time based on the positions of the plurality of satellites 200 at the time point later than the present time point by the predetermined time. Then, the communication control unit 102 determines whether the functional link through the plurality of satellites 200 at the present time point is to be disconnected at the time point later by the predetermined time. The predetermined time is a time determined by the number of satellites 200 included in the LEO satellite communication system, the scale of the LEO satellite communication system, sunlight influence, an area coverable by each satellite 200, a communication constraint, and the like. Specifically, the predetermined time is several seconds to a dozen seconds approximately.

When having determined that the functional link through the plurality of satellites 200 at the present time point is to be disconnected at the time point later by the predetermined time, the communication control unit 102 controls switching of transmission destinations of communication data transmitted and received by the plurality of satellites 200 before the link is disconnected. Specifically, the communication control unit 102 controls switching of transmission destinations of communication data transmitted and received by a plurality of satellites 200 related to the link to be disconnected so that the plurality of satellites 200 communicate with each other by using the predicted functional link at the time point later by the predetermined time. The communication control unit 102 controls, separately for each of C-plane and U-plane, switching of transmission destinations of communication data transmitted and received by the plurality of satellites 200.

The radio-frequency communication terminal 108 is a radio-frequency antenna for performing communication between the traffic control ground station) 100 and each satellite 200. The traffic control ground station 100 may include an optical communication terminal in place of the radio-frequency communication terminal 108 when communication between the traffic control ground station 100 and each satellite 200 is optical communication.

According to the first example embodiment described above, it is possible to provide the traffic control ground station 100 that can prevent instantaneous interruption of communication. Specifically, the communication control unit 102 controls switching of transmission destinations of communication data transmitted and received by the plurality of satellites 200 so that communication is performed by using the functional link at the time point later by the predetermined time before the functional link through the plurality of satellites 200 at the present time point is disconnected at the time point later by the predetermined time.

Thus, it is possible to switch transmission destinations of communication data transmitted and received by the plurality of satellites 200 before instantaneous interruption of communication occurs. Accordingly, it is possible to provide the traffic control ground station 100 that can prevent instantaneous interruption of communication.

Second Example Embodiment

Figure 3:
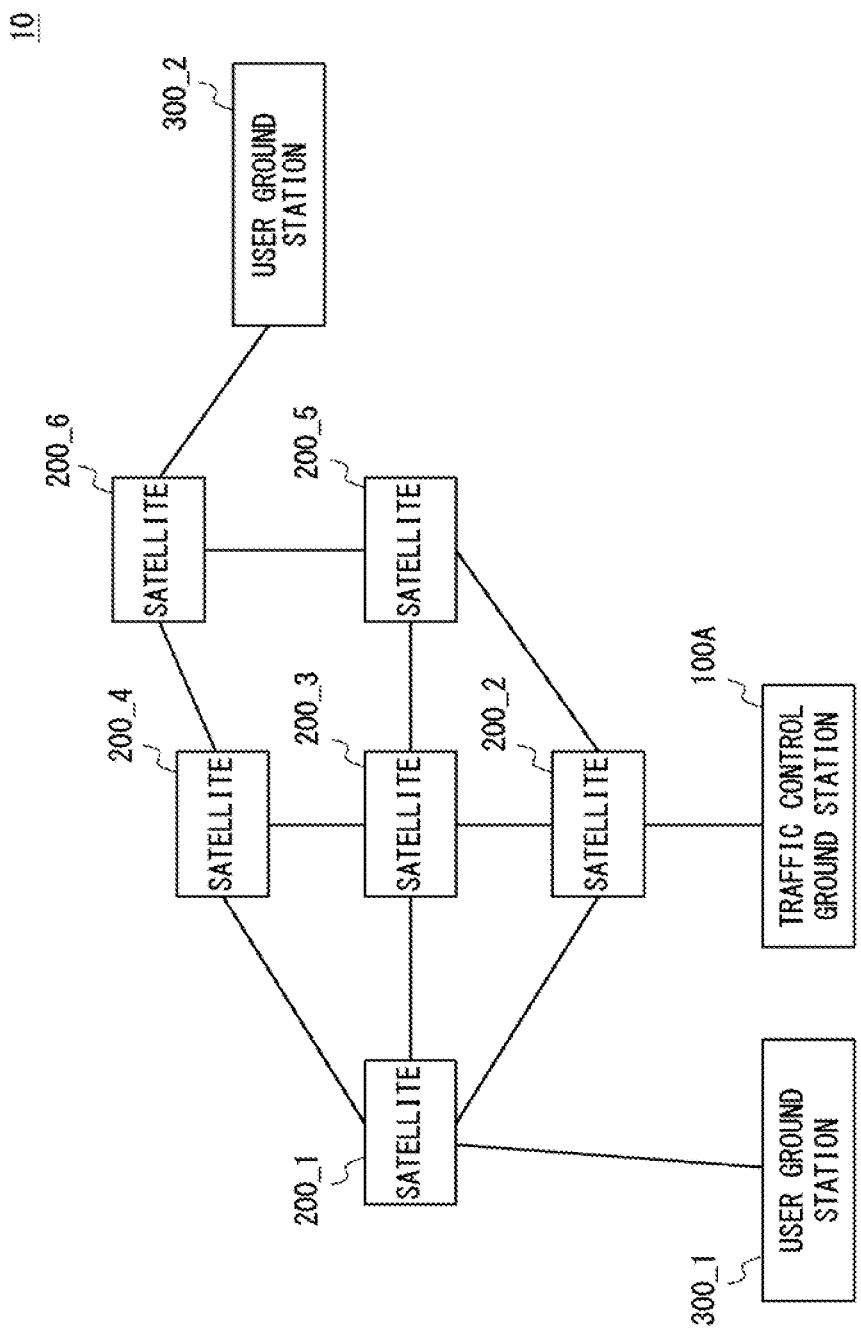
FIG. 3 is a block diagram illustrating an example of the configuration of a satellite constellation system according to a second example embodiment.

FIG. 3 is a block diagram illustrating an example of the configuration of an LEO satellite communication system 10 as a satellite constellation system according to a second example embodiment. As illustrated in FIG. 3, the LEO satellite communication system 10 includes the plurality of satellites 200_1 to 200_6, a traffic control ground station 100A as a satellite constellation apparatus, and user ground stations 300_1 and 300_2. In the LEO satellite communication system 10, the traffic control ground station 100A is capable of communicating with each of the plurality of satellites 200_1 to 200_6. In the LEO satellite communication system 10, the user ground stations 300_1 and 300_2 are capable of communicating with at least any of the plurality of satellites 200_1 to 200_6. In the LEO satellite communication system 10, the traffic control ground station 100A is capable of communicating with the user ground stations 300_1 and 300_2. Specifically, the traffic control ground station 100, the plurality of satellites 200_1 to 200_6, and the user ground stations 300_1 and 300_2 are each provided with one IP address. In the present specification, the user ground stations 300_1 and 300_2 are simply referred to as user ground stations 300 when not distinguished from one another. In the present specification, the number of user ground stations 300 is not limited to the number of illustrations. As illustrated in FIG. 2, the satellite 200_1 orbits on the trajectory 2_1, the satellites 200_2 to 200_4 orbit on the trajectory 2_2, and the satellites 200_5 and 200_6 orbit on the trajectory 2_3.

Figure 4:
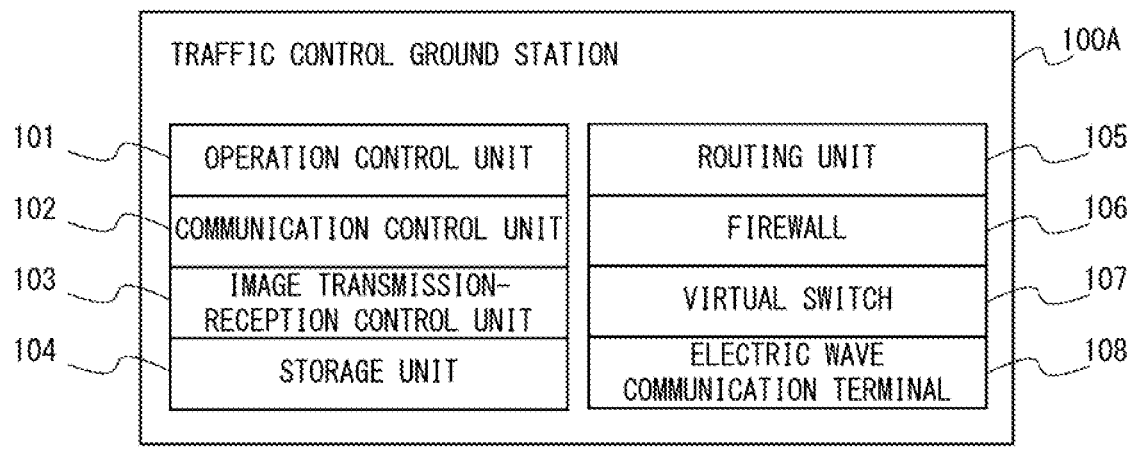
FIG. 4 is a block diagram illustrating an example of the configuration of a traffic control ground station according to the second example embodiment.

FIG. 4 illustrates an example of the configuration of the traffic control ground station 100A according to the second example embodiment. As illustrated in FIG. 4, the traffic control ground station 100A includes an operation control unit 101, the communication control unit 102 as a traffic control communication control unit, an image transmission-reception control unit 103, a storage unit 104, a routing unit 105, a firewall 106, a virtual switch 107, and the radio-frequency communication terminal 108. In the second example embodiment, the traffic control ground station 100A establishes links connecting the satellites 200 to lower-level layers (the physical layer or the data link layer of the OSI reference model) by radio-frequency (RF) communication. The traffic control ground station 100A can transfer Ethernet frames to each satellite 200 in a higher-level layer (higher-level layer of the physical layer). Moreover, the traffic control ground station 100A performs TCP/IP communication in the higher-level layer.

The operation control unit 101 controls the posture of each satellite 200. In addition, the operation control unit 101 instructs angle adjustment of an optical communication terminal 209 (to be described later) of each satellite 200 or the like.

As in the first example embodiment, the communication control unit 102 predicts the functional link through the plurality of satellites 200 at the time point later than the present time point by the predetermined time based on the trajectories 2 of the plurality of satellites 200 included in the LEO satellite communication system 10. This functional link prediction is performed not to include a loop configuration. In addition, the communication control unit 102 performs path recalculation to predict a shortest-delay link having the shortest communication delay among the functional link through the plurality of satellites 200 at the time point later by the predetermined time. A link predicted by the communication control unit 102 are not limited to the shortest-delay link but only need to be a functional link without a loop configuration. Then, the communication control unit 102 determines whether the functional link through the plurality of satellites 200 at the present time point is to be disconnected at the time point later by the predetermined time. When having determined that the functional link through the plurality of satellites 200 at the present time point is to be disconnected at the time point later by the predetermined time, the communication control unit 102 controls switching of transmission destinations of communication data transmitted and received by the plurality of satellites 200 before the link is disconnected. Specifically, the communication control unit 102 controls switching of transmission destinations of communication data transmitted and received by the plurality of satellites 200 related to the link to be disconnected so that the plurality of satellites 200 perform communication by using the predicted shortest-delay link. The communication control unit 102 controls, separately for each of C-plane and U-plane, switching of transmission destinations of communication data transmitted and received by the plurality of satellites 200.

Specifically, the communication control unit 102 transmits a control signal to a communication control unit 202 (to be described later) through C-plane so that the corresponding satellite 200 performs communication by using the functional shortest-delay link at the time point later by the predetermined time. The communication control unit 202 controls a virtual switch 208 (to be described later) of the satellite 200 in accordance with the control signal. Then, the virtual switch 208 rewrites the header of communication data (frame or packet). Accordingly, the communication data is transmitted from the satellite 200 to another satellite 200 or a user ground station 300 through the shortest-delay link.

In addition, the communication control unit 102 outputs a control signal to the virtual switch 107 so that the traffic control ground station 100A performs communication by using the functional shortest-delay link at the time point later by the predetermined time.

The image transmission-reception control unit 103 transmits a control signal to an image transmission-reception control unit 203 (to be described later) of each satellite 200 so that image data captured by an image capturing unit 204 (to be described later) of the satellite 200 is transmitted to the traffic control ground station 100A.

The storage unit 104 stores a Linux (registered trademark) TCP/IP stack, a dynamic routing table, iptables referred by the firewall 106, and the like. The storage unit 104 may include a non-volatile memory (for example, a read only memory (ROM)) in which various programs and various kinds of data that are necessary for processing are fixedly stored. The storage unit 104 may use an HDD or an SSD. The storage unit 104 may additionally include a volatile memory (for example, a random access memory (RAM)) used as a work area. The above-described programs may be read from a portable recording medium such as an optical disk or a semiconductor memory or may be downloaded from a server apparatus on a network.

The routing unit 105 refers to the dynamic routing table and determines the transmission destination of communication data (frame or packet).

The firewall 106 refers to iptables and removes any unauthorized communication data.

The virtual switch 107 rewrites the header of communication data (frame or packet) based on a control signal input from the communication control unit 102. Accordingly, the communication data is transmitted from the traffic control ground station 100A to a satellite 200 or a user ground station 300 through a functional link.

As in the first example embodiment, the radio-frequency communication terminal 108 is a radio-frequency antenna for performing communication between the traffic control ground station 100A and each satellite 200. The traffic control ground station 100A may include an optical communication terminal in place of the radio-frequency communication terminal 108 when communication between the traffic control ground station 100A and each satellite 200 is optical communication.

Figure 5:
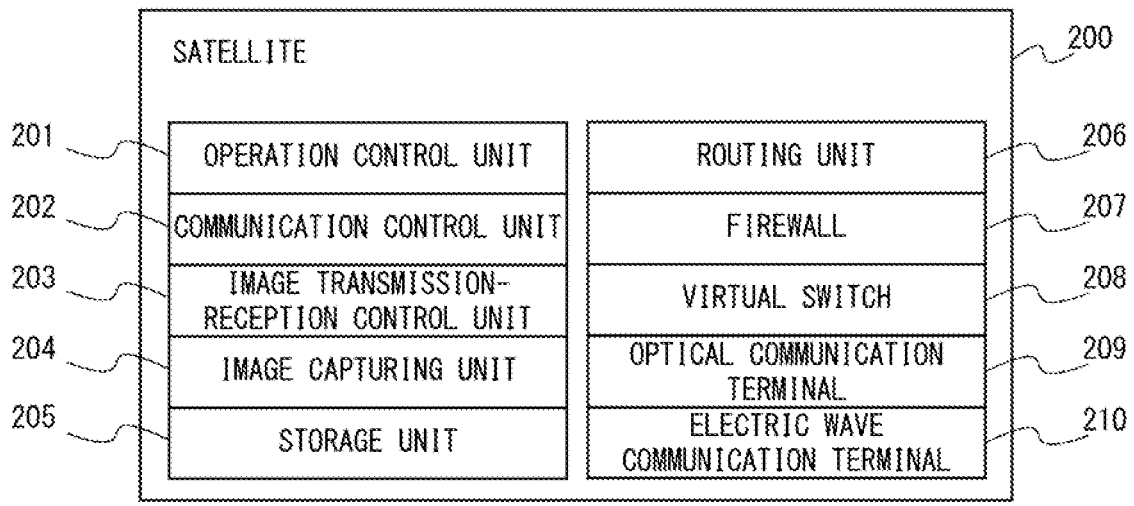
FIG. 5 is a block diagram illustrating an example of the configuration of a satellite according to the second example embodiment.

FIG. 5 illustrates an example of the configuration of each satellite 200 according to the second example embodiment. As illustrated in FIG. 5, each satellite 200 includes an operation control unit 201, the communication control unit 202 as a satellite communication control unit, the image transmission-reception control unit 203, the image capturing unit 204, a storage unit 205, a routing unit 206, a firewall 207, the virtual switch 208, the optical communication terminal 209, and a radio-frequency communication terminal 210. In the second example embodiment, each satellite 200 establishes links connecting the traffic control ground station 100A and the user ground stations 300 to lower-level layers (the physical layer and the data link layer of the OSI reference model) by radio-frequency (RF) communication. Each satellite 200 also establishes links connecting any other satellite 200 to lower-level layers (the physical layer or the data link layer of the OSI reference model) by optical communication. Each satellite 200 can transfer Ethernet frames to the traffic control ground station 100A, the user ground stations 300, and the other satellites 200 in a higher-level layer (higher-level layer of the physical layer). Moreover, each satellite 200 performs TCP/IP communication in the higher-level layer.

The operation control unit 201 controls the posture of the satellite 200 in accordance with a control signal transmitted from the traffic control ground station 100A. In addition, the operation control unit 201 performs angle adjustment of the optical communication terminal 209, the radio-frequency communication terminal 210, and the like of the satellite 200 in accordance with a control signal transmitted from the traffic control ground station 100A.

The communication control unit 202 controls the virtual switch 208 in accordance with a control signal transmitted from the traffic control ground station 100A. Accordingly, communication data is transmitted from the satellite 200 to another satellite 200 or a user ground station 300 through the functional shortest-delay link.

The image transmission-reception control unit 203 controls the image capturing unit 204 to acquire image data through image capturing of, for example, the ground. The image transmission-reception control unit 203 transmits the image data captured by the image capturing unit 204 to the traffic control ground station 100A.

The image capturing unit 204 includes a camera or the like and acquires image data in accordance with control by the image transmission-reception control unit 203.

The storage unit 205 stores a Linux (registered trademark) TCP/IP stack, a dynamic routing table, iptables referred by the firewall 207, and the like. The storage unit 205 may include a non-volatile memory (for example, a read only memory (ROM)) in which various programs and various kinds of data that are necessary for processing are fixedly stored. The storage unit 205 may use an HDD or an SSD. The storage unit 205 may additionally include a volatile memory (for example, a random access memory (RAM)) used as a work area. The above-described programs may be read from a portable recording medium such as an optical disk or a semiconductor memory or may be downloaded from a server apparatus on a network.

The routing unit 206 refers to the dynamic routing table and determines the transmission destination of communication data (frame or packet).

The firewall 207 refers to iptables and removes any unauthorized communication data.

The virtual switch 208 rewrites the header of communication data (frame or packet) based on a control signal input from the communication control unit 202. Accordingly, the communication data is transmitted from the satellite 200 to another satellite 200 or a user ground station 300 through the functional shortest-delay link.

The optical communication terminal 209 is an optical antenna for performing communication with the other satellites 200.

The radio-frequency communication terminal 210 is a radio-frequency antenna for performing communication between the satellite 200 and each of the traffic control ground station 100A and the user ground stations 300. The radio-frequency communication terminal 210 may be substituted with the optical communication terminal 209 when communication between the satellite 200 and each of the traffic control ground station 100A and the user ground stations 300 is optical communication.

Figure 6:
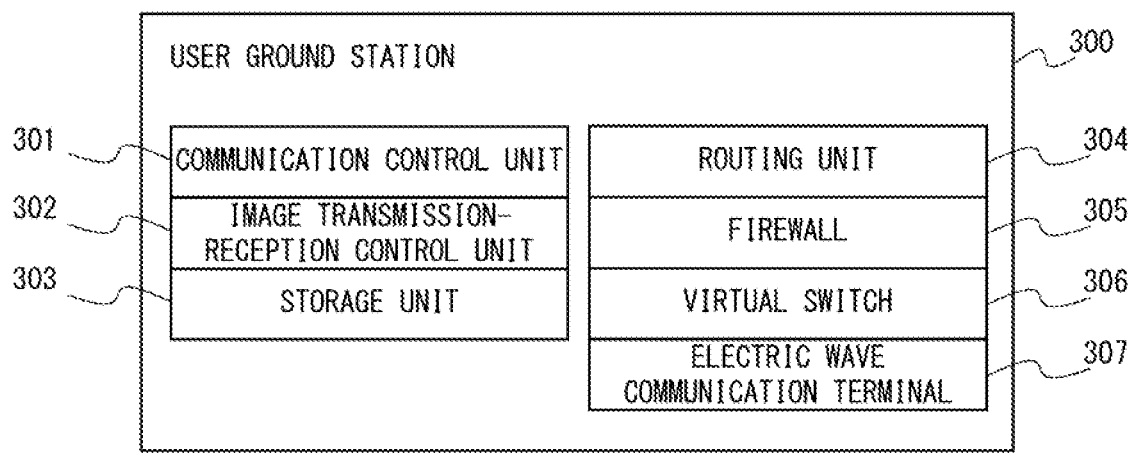
FIG. 6 is a block diagram illustrating an example of the configuration of a user ground station according to the second example embodiment.

FIG. 6 illustrates an example of the configuration of each user ground station 300 according to the second example embodiment. As illustrated in FIG. 6, each user ground station 300 includes a communication control unit 301, an image transmission-reception control unit 302, a storage unit 303, a routing unit 304, a firewall 305, a virtual switch 306, and a radio-frequency communication terminal 307. In the second example embodiment, each user ground station 300 establishes links connecting a satellite 200 to lower-level layers (the physical layer or the data link layer of the OSI reference model) by radio-frequency (RF) communication. Each user ground station 300 can transfer Ethernet frames to each satellite 200 in a higher-level layer (higher-level layer of the physical layer). Moreover, each user ground station 300 performs TCP/IP communication in the higher-level layer.

The communication control unit 301 controls the virtual switch 306.

The image transmission-reception control unit 302 transmits a control signal to the image transmission-reception control unit 203 of a satellite 200 so that image data captured by the image capturing unit 204 of the satellite 200 is transmitted to the user ground station 300.

The storage unit 303 stores a Linux (registered trademark) TCP/IP stack, a dynamic routing table, iptables referred by the firewall 305, and the like. The storage unit 303 may include a non-volatile memory (for example, a read only memory (ROM)) in which various programs and various kinds of data that are necessary for processing are fixedly stored. The storage unit 303 may use an HDD or an SSD. The storage unit 303 may additionally include a volatile memory (for example, a random access memory (RAM)) used as a work area.

The above-described programs may be read from a portable recording medium such as an optical disk or a semiconductor memory or may be downloaded from a server apparatus on a network.

The routing unit 304 refers to the dynamic routing table and determines the transmission destination of communication data (frame or packet).

The firewall 305 refers to iptables and removes any unauthorized communication data.

The virtual switch 306 rewrites the header of communication data (frame or packet) based on a control signal input from the communication control unit 301. Accordingly, the communication data is transmitted from the user ground station 300 to a satellite 200 or the traffic control ground station 100A through the functional shortest-delay link.

The radio-frequency communication terminal 307 is a radio-frequency antenna for performing communication between the user ground station 300 and each satellite 200. The user ground station 300 may include an optical communication terminal in place of the radio-frequency communication terminal 307 when communication between the user ground station 300 and each satellite 200 is optical communication.

Figure 7:
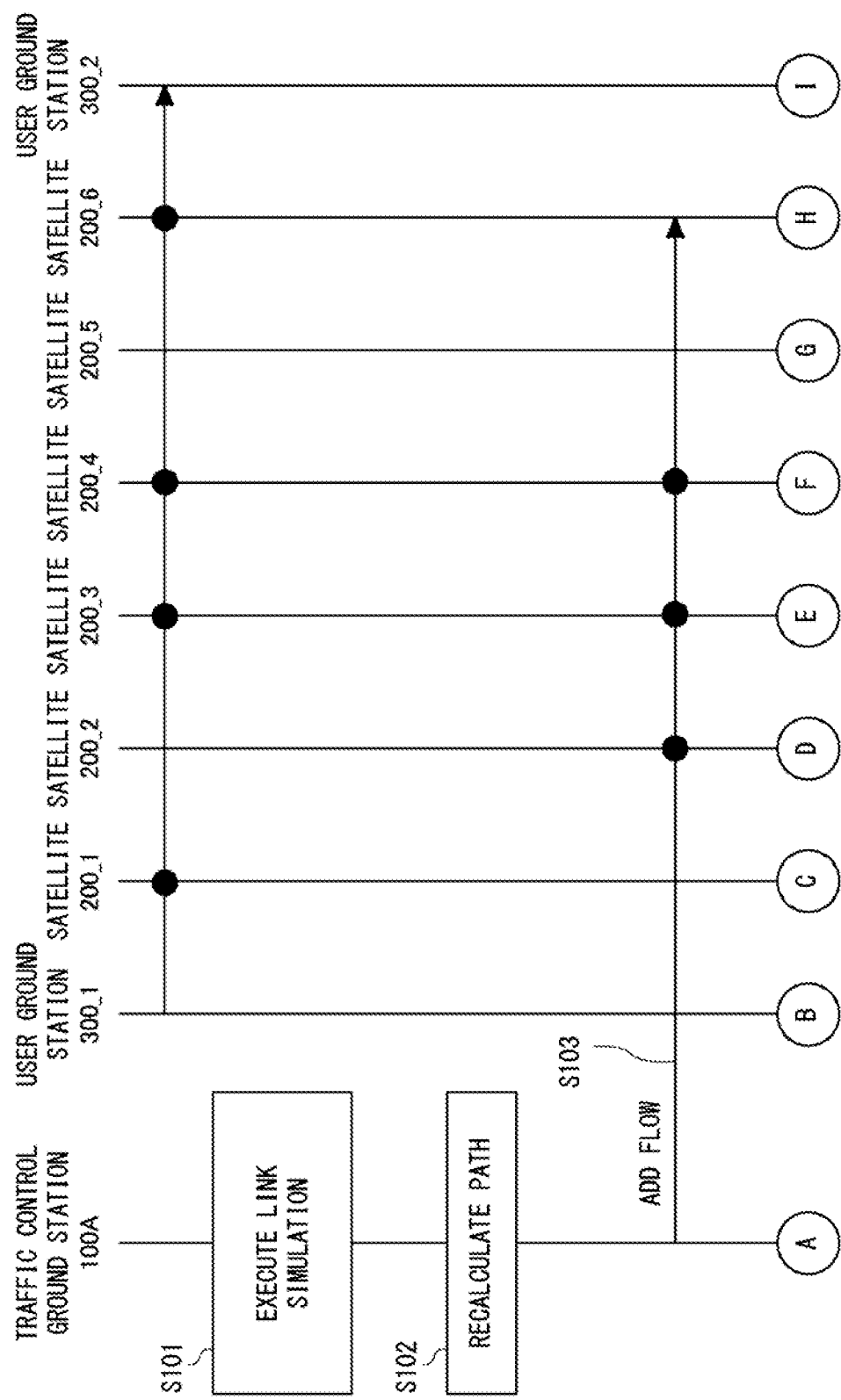
FIG. 7 is a flowchart illustrating a method according to the second example embodiment.
Figure 8:
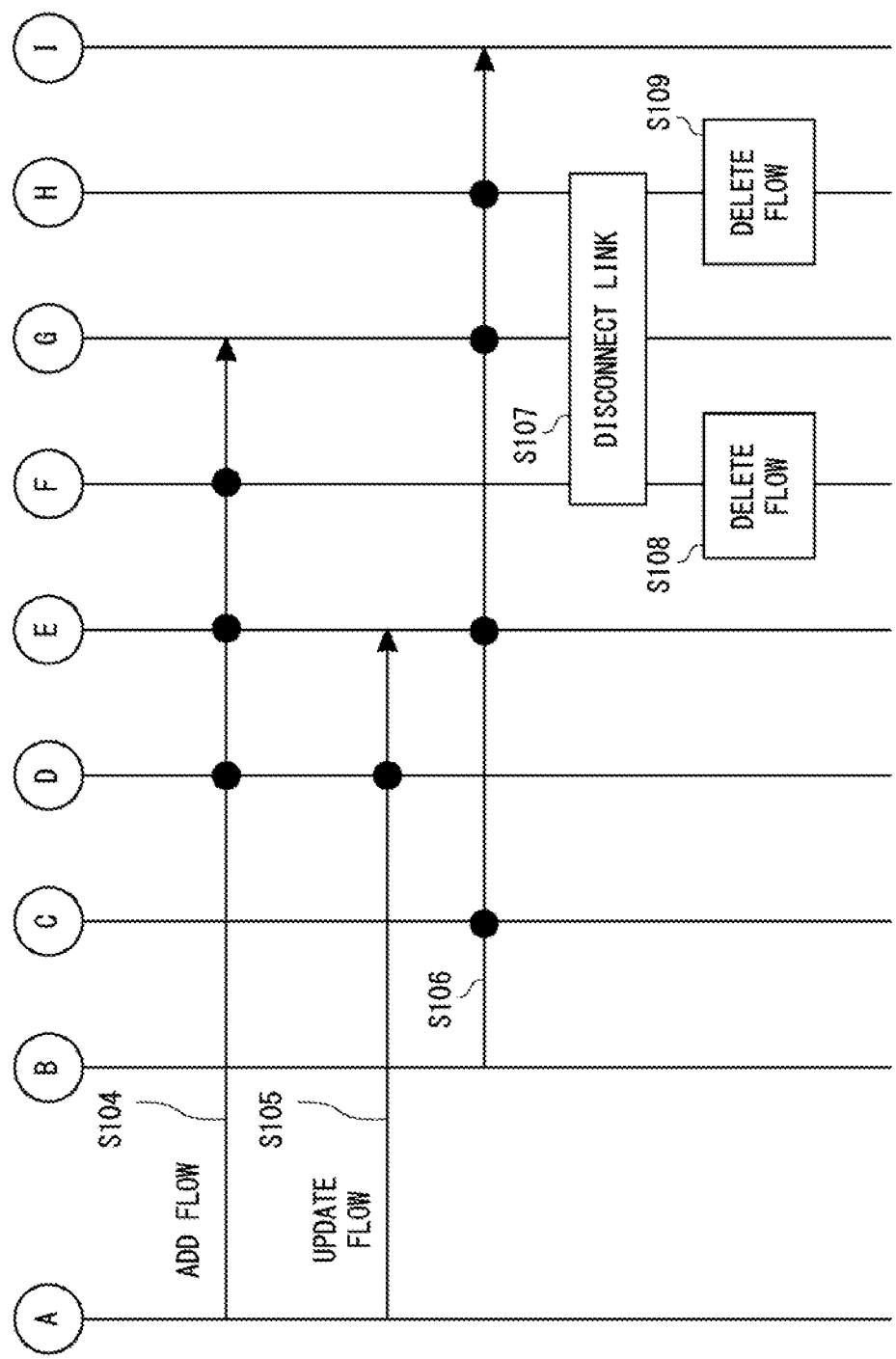
FIG. 8 is a flowchart illustrating the method according to the second example embodiment.
Figure 9:
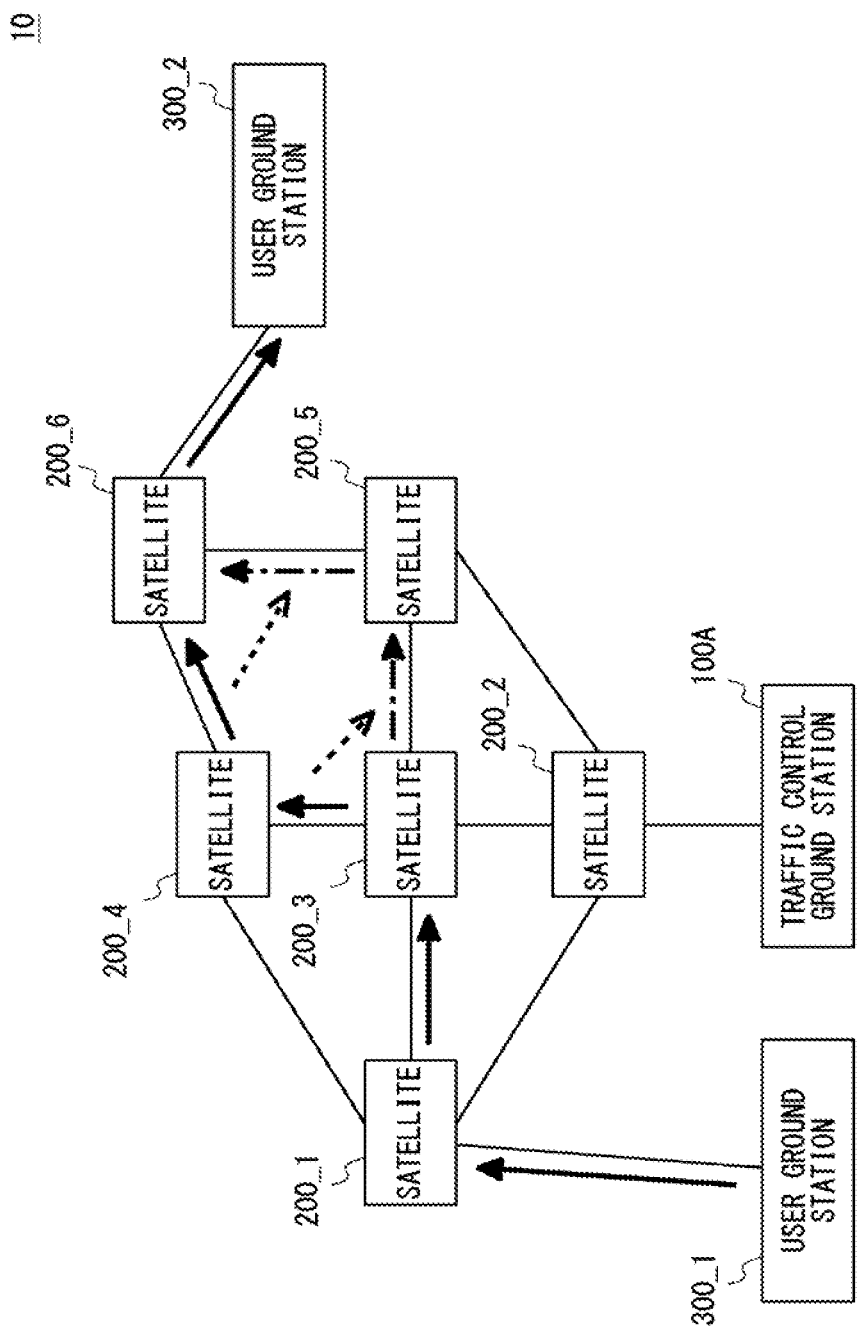
FIG. 9 is a diagram for description of the method according to the second example embodiment.
Figure 10:
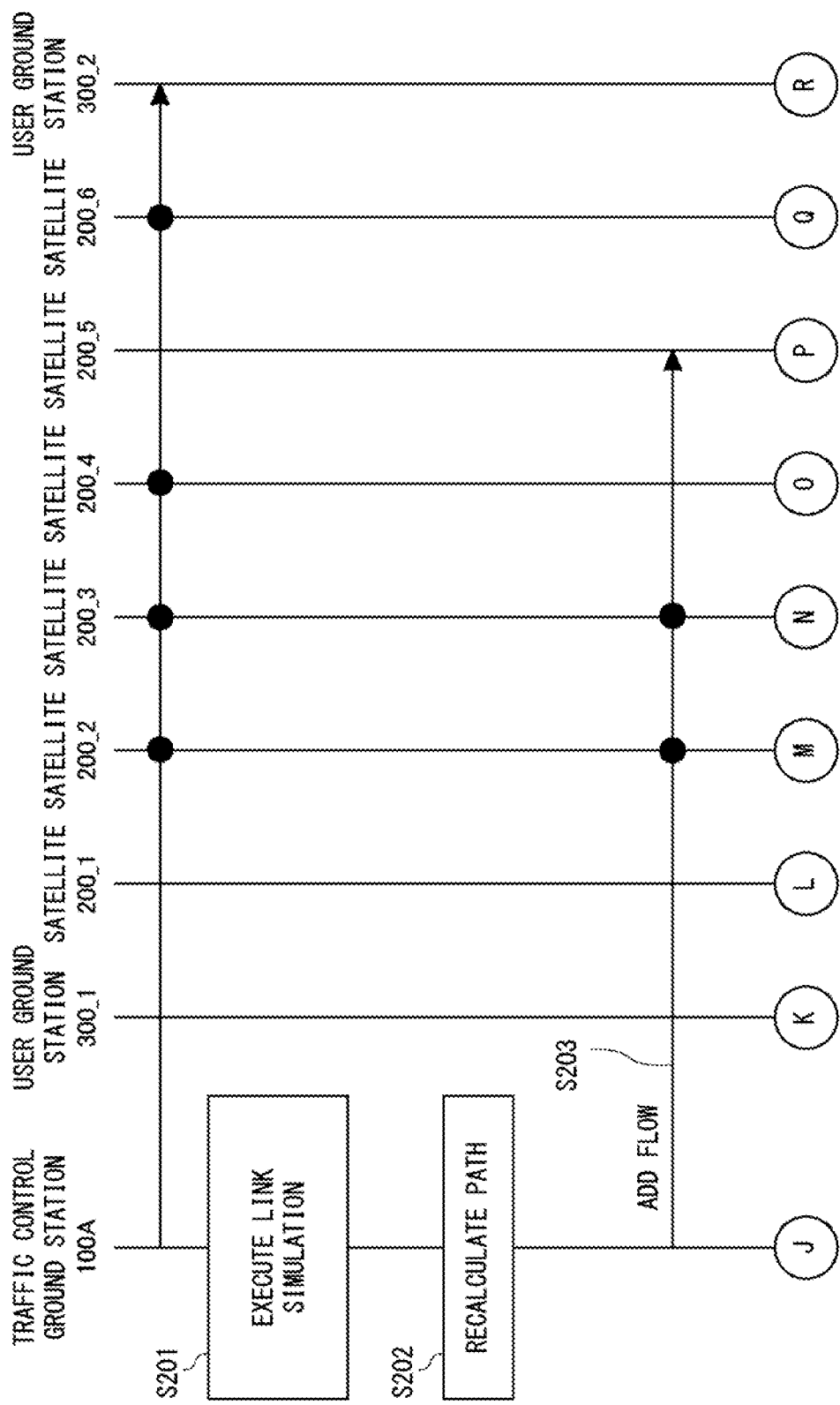
FIG. 10 is a flowchart illustrating the method according to the second example embodiment.
Figure 11:
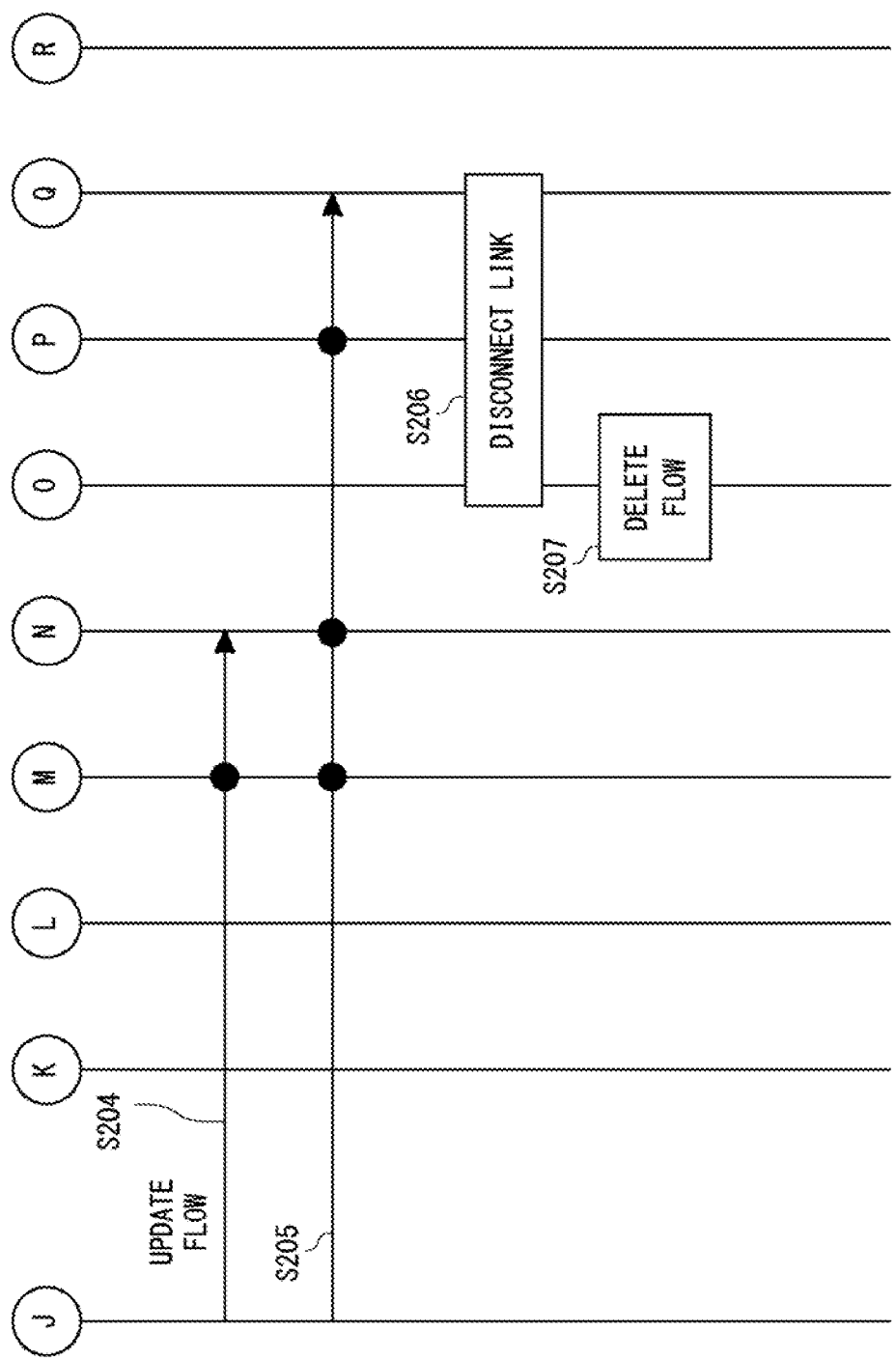
FIG. 11 is a flowchart illustrating the method according to the second example embodiment.
Figure 12:
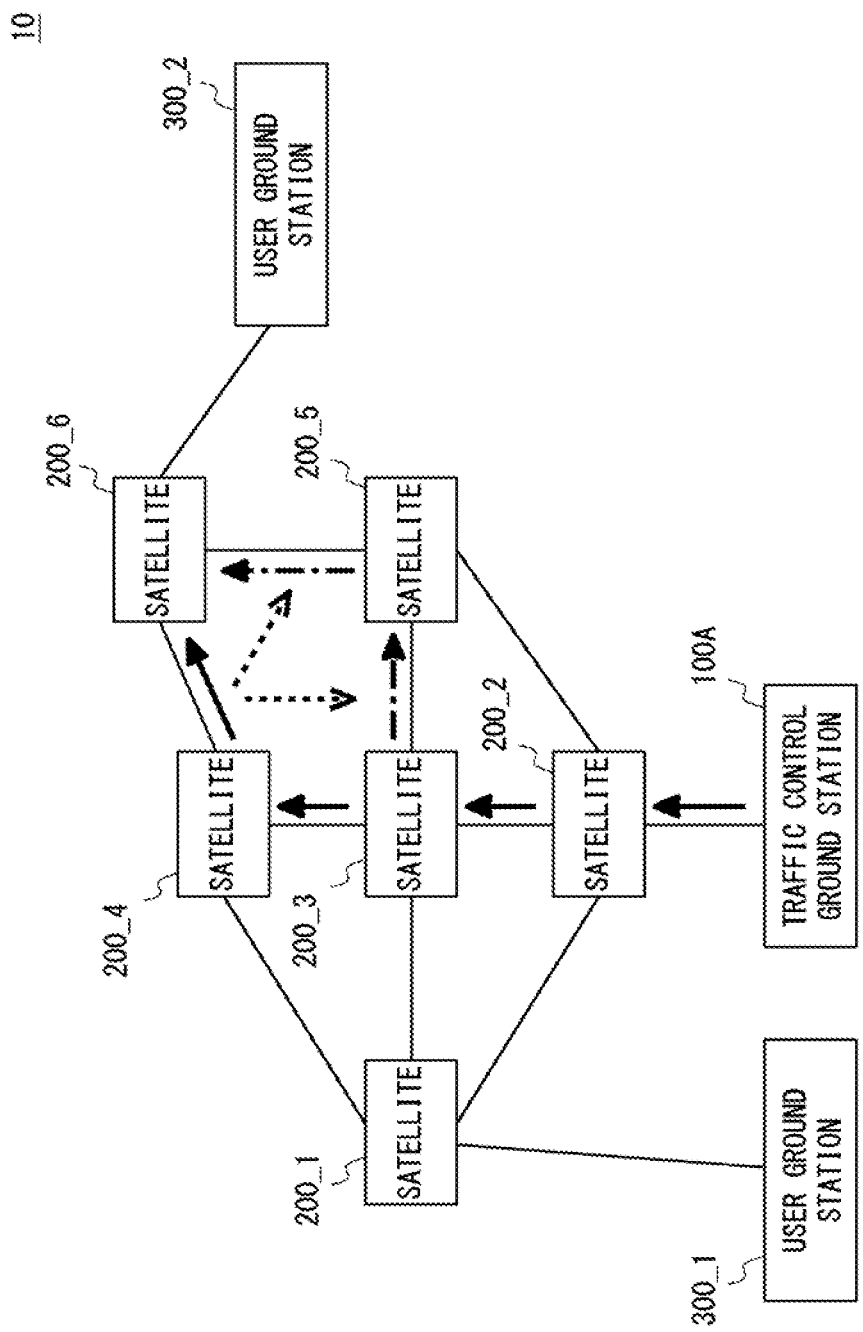
FIG. 12 is a diagram for description of the method according to the second example embodiment.

A method according to the second example embodiment will be described below with reference to FIGS. 7 to 12. FIGS. 7 to 9 illustrate a U-plane communication control method, and FIGS. 10 to 12 illustrate a C-plane communication control method. FIGS. 7 and 8 and FIGS. 10 and 11 are flowcharts illustrating the communication control methods, and FIGS. 9 and 12 are diagrams for description of the communication control methods. FIG. 9 illustrates an example in which communication data is transmitted by the user ground station 300_1 and received by the user ground station 300_2 by using U-plane including the satellites 200_1 to 200_6.

First, the U-plane communication control method will be described below. As illustrated in FIGS. 7 and 9, a communication path using a link between the satellites 200_1 and 200_3, a link between the satellites 200_3 and 200_4, and a link between the satellites 200_4 and 200_6 is established as a communication path from the user ground station 300_1 to the user ground station 300_2 at the present time point. As illustrated in FIG. 7, the communication control unit 102 of the traffic control ground station 100A executes link simulation (step S101). Specifically, the communication control unit 102 predicts the functional link through the plurality of satellites 200 at a time point up to several tens of seconds approximately later than the present time point. Then, the communication control unit 102 determines, based on a result of the link simulation, for example, that the link between the satellites 200_4 and 200_6 is to be disconnected at the time point (for example, five seconds later) later than the present time point by the predetermined time as illustrated in FIG. 9.

Subsequently, the communication control unit 102 performs path recalculation (step S102). Specifically, the communication control unit 102 predicts a shortest-delay link among functional links through the plurality of satellites 200 at the time point later by the predetermined time. More specifically, since the link between the satellites 200_4 and 200_6 is to be disconnected at the time point (for example, five seconds later) later than the present time point by the predetermined time, the communication control unit 102 predicts, as the shortest-delay link, a communication path using a link between the satellites 200_3 and 200_5 and a link between the satellites 200_5 and 200_6 in place of the link between the satellites 200_3 and 200_4 and the link between the satellites 200_4 and 200_6.

Subsequently, the communication control unit 102 performs flow addition for the satellite 200_6 (step S103). Specifically, a flow that sets the satellite 200_5 as the transmission source of communication data and sets the user ground station 300_2 as the transmission destination of communication data is transmitted as a control signal to the satellite 200_6 by using C-plane.

Subsequently, the communication control unit 102 performs flow addition for the satellite 200_5 (step S104). Specifically, a flow that sets the satellite 200_3 as the transmission source of communication data and sets the satellite 200_6 as the transmission destination of communication data is transmitted as a control signal to the satellite 200_5 by using C-plane.

Subsequently, the communication control unit 102 performs flow update for the satellite 200_3 (step S105). Specifically, a flow that changes the transmission destination of communication data from the satellite 200_4 to the satellite 200_5 is transmitted as a control signal to the satellite 200_3 by using C-plane.

Subsequently, the link between the satellites 200_4 and 200_6 is disconnected along with relative movement of the satellites 200 with respect to the surface of the ground after elapse of the predetermined time (for example, five seconds) (step S107).

Subsequently, the communication control unit 202 of the satellite 200_3 deletes an old flow (step S108), and the communication control unit 202 of the satellite 200_6 deletes an old flow (step S109). The processing at step S108 and the processing at step S109 may be simultaneously performed, or the processing at step S109 may be performed before the processing at step S108.

Subsequently, the C-plane communication control method will be described below. As illustrated in FIGS. 10 and 12, a communication path using the link between the satellites 200_2 and 200_3, the link between the satellites 200_3 and 200_4, and the link between the satellites 200_4 and 200_6 is established as a communication path from the traffic control ground station 100A to the user ground station 300_2 through the satellites 200_2, 200_3, 200_4, and 200_6 at the present time point. As illustrated in FIG. 10, the communication control unit 102 of the traffic control ground station 100A executes link simulation (step S201). Specific contents of the processing are the same as in step S101. Then, the communication control unit 102 determines, based on a result of the link simulation, for example, that the link between the satellites 200_4 and 200_6 is to be disconnected at the time point (for example, five seconds later) later than the present time point by the predetermined time as illustrated in FIG. 12.

Subsequently, the communication control unit 102 performs path recalculation (step S202). Specific contents of the processing are the same as in step S102. Then, the communication control unit 102 predicts, as the shortest-delay link, a communication path using the link between the satellites 200_3 and 200_5 and the link between the satellites 200_5 and 200_6 in place of the link between the satellites 200_4 and 200_6.

Subsequently, the communication control unit 102 performs flow addition for the satellite 200_5 (step S203). Specifically, a flow that sets the satellite 200_3 as the transmission source of communication data and sets the satellite 200_6 as the transmission destination of communication data is transmitted as a control signal to the satellite 200_5 by using C-plane at the present time point.

Subsequently, the communication control unit 102 performs flow update for the satellite 200_3 (step S204). Specifically, a flow that changes the transmission destination of communication data from the satellite 200_4 to the satellite 200_5 is transmitted as a control signal to the satellite 200_3 by using C-plane at the present time point.

Subsequently, the link between the satellites 200_4 and 200_6 is disconnected along with relative movement of the satellites 200 with respect to the surface of the ground after elapse of the predetermined time (for example, five seconds) (step S206).

Subsequently, the communication control unit 202 of the satellite 200_3 deletes an old flow (step S207).

According to the second example embodiment, it is possible to provide the traffic control ground station 100A, the LEO satellite communication system 10, the communication control method, and the non-transitory computer-readable medium that are capable of preventing instantaneous interruption of communication. Specifically, the communication control unit 102 controls switching of transmission destinations of communication data transmitted and received by the plurality of satellites 200 so that communication is performed by using the functional link at the time point later by the predetermined time before the functional link through the plurality of satellites 200 at the present time point is disconnected at the time point later by the predetermined time. Thus, it is possible to switch transmission destinations of communication data transmitted and received by the plurality of satellites 200 before instantaneous interruption of communication occurs. Accordingly, it is possible to provide the traffic control ground station 100A, the LEO satellite communication system 10, the communication control method, and the non-transitory computer-readable medium that are capable of prevent instantaneous interruption of communication.

Switching of transmission destinations of communication data transmitted and received by the plurality of satellites is controlled separately for each of C-plane and U-plane by the communication control unit 102. Thus, it is possible to flexibly control an independent communication path for each of C-plane and U-plane.

In addition, the shortest-delay link among a plurality of functional links at the time point later than the present time point by the predetermined time is predicted by the communication control unit 102. Thus, it is possible to shorten communication delay as much as possible.

Moreover, no communication control needs to be performed among satellites 200, and thus it is unnecessary to perform a large amount of communication and processing for exchanging path information between satellites 200.

Since the transmission destination of communication data from each satellite 200 is controlled by using the virtual switch 208, only one IP address needs to be provided to each satellite 200 and thus it is possible to reduce the number of consumed IP addresses and reduce a large number of sub network configurations as compared to the transfer scheme in which each satellite 200 is regarded as a router.

Modification of Second Example Embodiment

Figure 13:
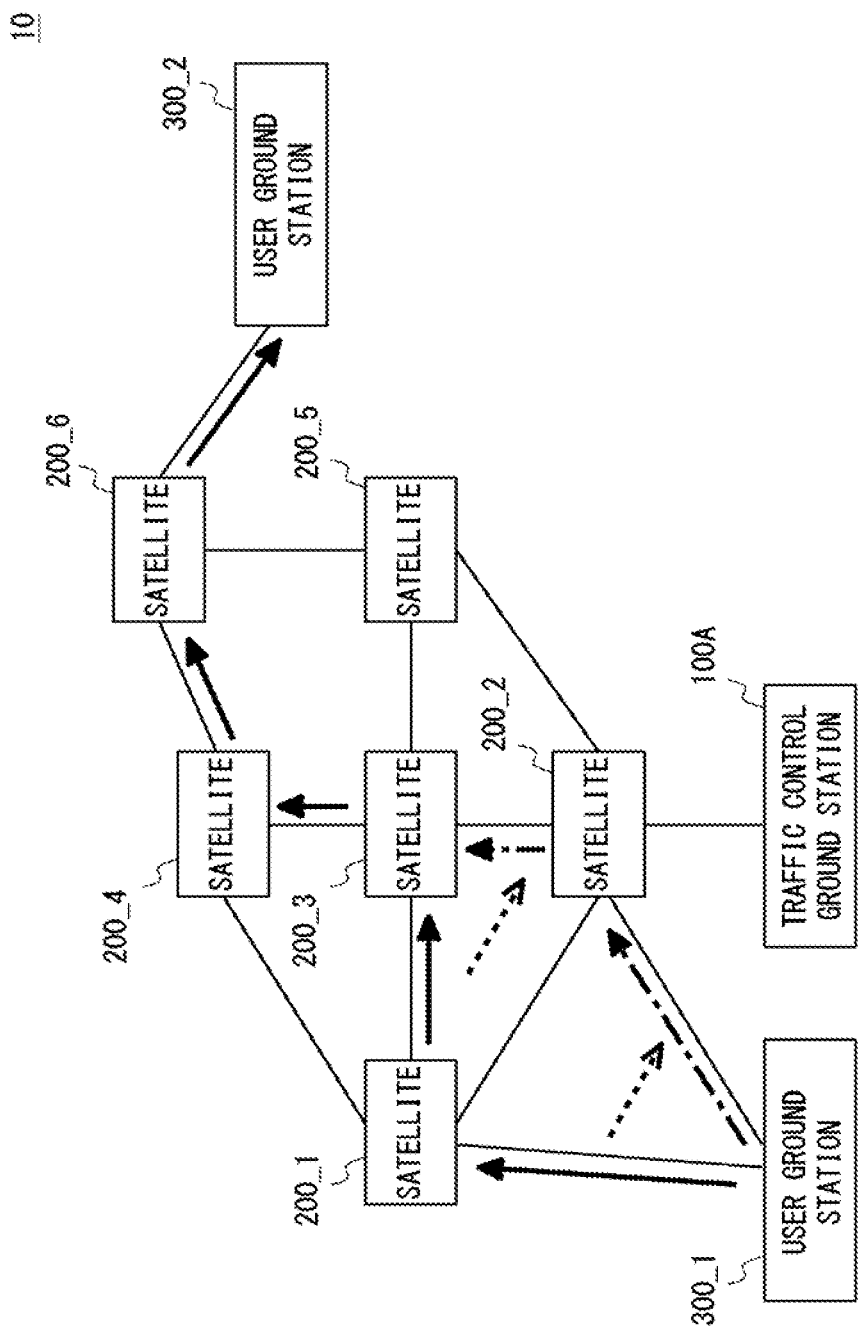
FIG. 13 is a diagram for description of a method according to a modification of the second example embodiment.

FIG. 13 is a diagram for description of a method according to a modification of the second example embodiment. As illustrated in FIG. 13, the traffic control ground station 100A may control the transmission destination of communication data from each user ground station 300. For example, as illustrated in FIG. 13, the traffic control ground station 100A predicts that a link between the user ground station 300_1 and the satellite 200_1 is to be disconnected at the time point later than the present time point by the predetermined time. Then, the traffic control ground station 100A may transmit, to the user ground station 300_1, a control signal for controlling the virtual switch 306 of the user ground station 300_1 to set the satellite 200_2 as the transmission destination of communication data.

Third Example Embodiment

Figure 14:
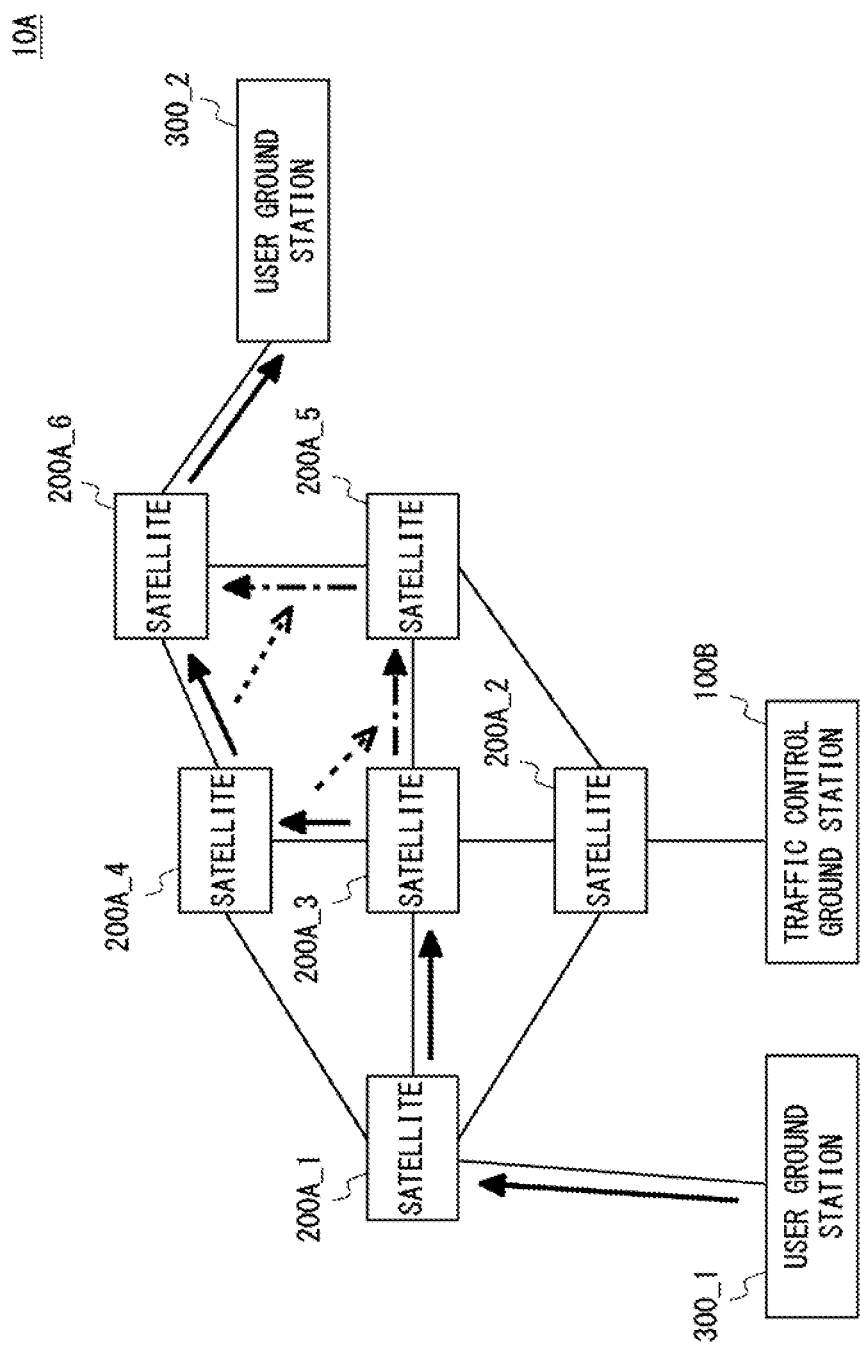
FIG. 14 is a block diagram illustrating an example of the configuration of a satellite constellation system according to a third example embodiment.

FIG. 14 is a block diagram illustrating the configuration of an LEO satellite communication system 10A according to a third example embodiment. As illustrated in FIG. 14, the configurations of a traffic control ground station 100B and satellites 200A in the LEO satellite communication system 10A according to the third example embodiment are differences from the LEO satellite communication system 10 according to the second example embodiment. Thus, among components of the LEO satellite communication system 10A according to the third example embodiment, any component same as in the LEO satellite communication system 10 according to the second example embodiment is denoted by the same reference sign and description thereof is omitted.

Figure 15:
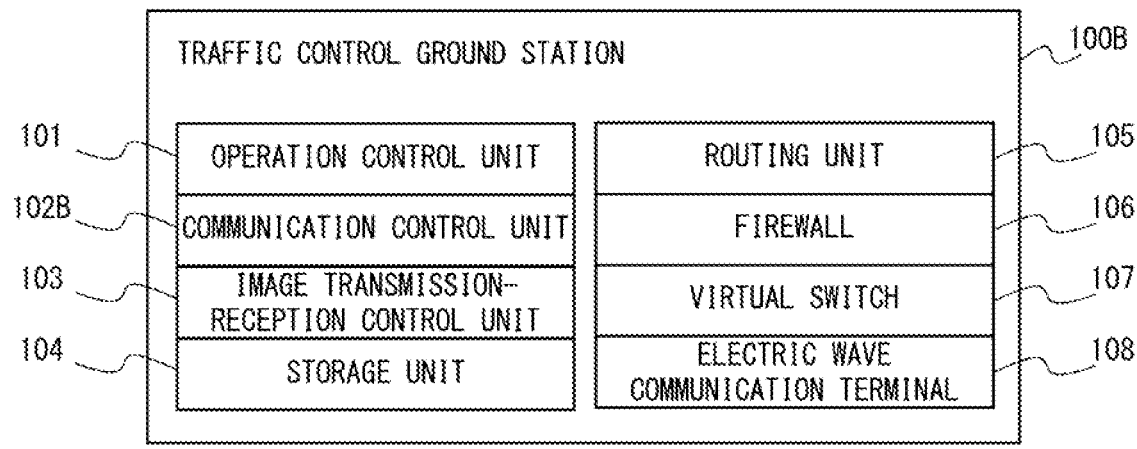
FIG. 15 is a block diagram illustrating an example of the configuration of a traffic control ground station according to the third example embodiment.

FIG. 15 illustrates the configuration of a traffic control ground station 100B according to the third example embodiment. As illustrated in FIG. 15, the configuration of a communication control unit 102B as a traffic control communication control unit in the traffic control ground station 100B according to the third example embodiment is a difference from the traffic control ground station 100A according to the second example embodiment. Thus, among components of the traffic control ground station 100B according to the third example embodiment, any component same as in the traffic control ground station 100A according to the second example embodiment is denoted by the same reference sign and description thereof is omitted.

The communication control unit 102B performs the same processing as the communication control unit 102 according to the second example embodiment. In addition, a link other than the shortest-delay link among functional links through the plurality of satellites 200A at the time point later by the predetermined time is predicted as a backup link, which is a difference from the communication control unit 102 according to the second example embodiment. Then, the communication control unit 102B transmits the backup link to the plurality of satellites 200A in advance.

Figure 16:
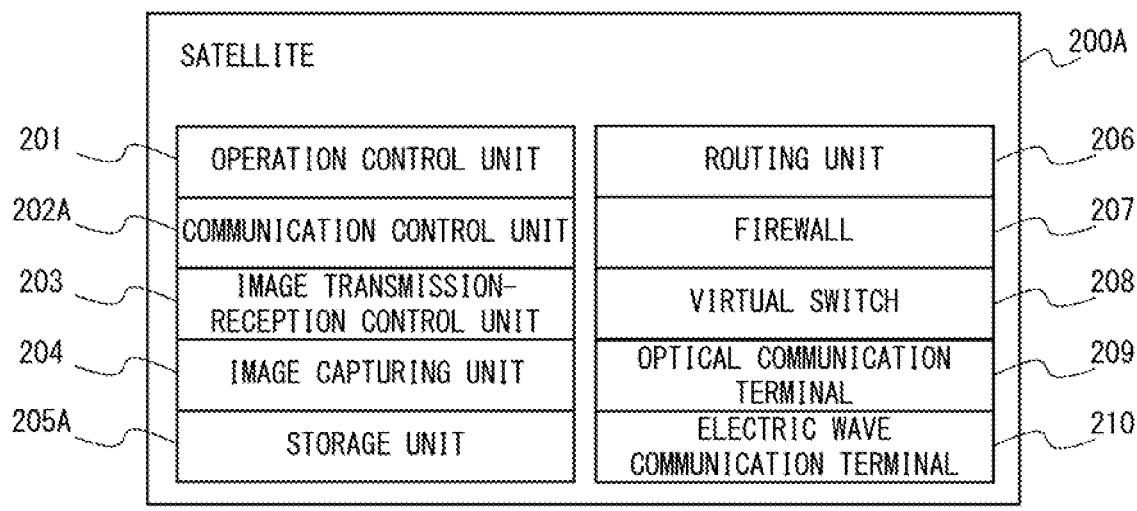
FIG. 16 is a block diagram illustrating an example of the configuration of a satellite according to the third example embodiment.

FIG. 16 illustrates the configuration of each satellite 200A according to the third example embodiment. As illustrated in FIG. 16, the configurations of a communication control unit 202A as a satellite communication control unit and a storage unit 205A in each satellite 200A according to the third example embodiment are differences from each satellite 200 according to the second example embodiment. Thus, among components of each satellite 200A according to the third example embodiment, any component same as in each satellite 200 according to the second example embodiment is denoted by the same reference sign and description thereof is omitted.

The communication control unit 202A performs the same processing as the communication control unit 202 according to the second example embodiment. In addition, the communication control unit 202A periodically transmits and receives a test signal to and from another satellite 200. Then, the communication control unit 202A determines whether a link between the satellite 200 and the other satellite 200 is disconnected based on a result of the test-signal transmission and reception. When the link between the satellite 200 and the other satellite 200 is disconnected, the communication control unit 202A controls the virtual switch 208 so that communication data is transmitted and received by using the backup link transmitted from the traffic control ground station 100B in advance.

For example, when a link between the satellites 200A_3 and 200A_4 and a link between the satellites 200A_4 and 200A_6 are disconnected due to failure of the satellite 200A_4 or the like as illustrated in FIG. 14, the communication control unit 202A controls the virtual switch 208 so that communication data is transmitted and received by using the backup link. Specifically, the communication control unit 202A controls the virtual switch 208 so that a link between the satellites 200A_3 and 200A_5 and a link between the satellites 200A_5 and 200A_6 are used in place of the link between the satellites 200A_3 and 200A_4 and the link between the satellites 200A_4 and 200A_6.

The storage unit 205A stores the same various programs and various kinds of data as the storage unit 205 according to the second example embodiment. In addition, the storage unit 205A stores information of the backup link transmitted from the traffic control ground station 100B in advance.

According to the third example embodiment, any satellite 200 can restructure a communication path by using the backup link when unpredictable link disconnection occurs due to failure of the satellite 200 or the like. The LEO satellite communication system includes a large number of satellites lighter than satellites orbiting on GEO. Accordingly, the lifetimes of satellites in the LEO satellite communication system are often shorter than those of satellites orbiting on GEO. Thus, it is needed to handle unpredictable link disconnection due to unexpected failure of any satellite 200. However, according to the third example embodiment, each satellite 200 can recover communication by using the backup link upon unpredictable link disconnection.

In the example embodiments above, the present disclosure is described as a hardware configuration, but is not limited thereto. In the present disclosure, the processing procedures illustrated in the flowcharts in FIGS. 7, 8, 10, and 11 and processing procedures described in any other example embodiment may be implemented as a central processing unit (CPU) executes a computer program.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The first, second and third embodiments can be combined as desirable by one of ordinary skill in the art.

According to the present disclosure, it is possible to provide a satellite constellation apparatus, a satellite constellation system, a method, and a non-transitory computer-readable medium that can prevent instantaneous interruption of communication.

The whole or part of the exemplary embodiments disclosed above can be described as, but not limited to, the following supplementary notes.

(Supplementary Note 1)

A satellite constellation apparatus capable of communicating with a plurality of satellites, the satellite constellation apparatus comprising a traffic control communication control unit configured to predict a functional link through the plurality of satellites at a time point later than the present time point by a predetermined time based on trajectories of the plurality of satellites and control switching of transmission destinations of communication data transmitted and received by the satellites so that communication is performed by using the predicted functional link before the functional link through the plurality of satellites at the present time point is disconnected at the time point later by the predetermined time.

(Supplementary Note 2)

The satellite constellation apparatus according to Supplementary note 1, wherein the traffic control communication control unit controls, separately for each of C-plane and U-plane, switching of transmission destinations of communication data transmitted and received by the plurality of satellites.

(Supplementary Note 3)

The satellite constellation apparatus according to Supplementary note 1 or 2, wherein the traffic control communication control unit predicts a shortest-delay link having a shortest communication delay among functional links through the plurality of satellites at the time point later by the predetermined time.

(Supplementary Note 4)

The satellite constellation apparatus according to Supplementary note 3, wherein
- the traffic control communication control unit predicts, as a backup link, a link other than the shortest-delay link among functional links through the plurality of satellites at the time point later by the predetermined time, and
- the satellite constellation apparatus transmits the backup link to the plurality of satellites in advance.

(Supplementary Note 5)

A satellite constellation system comprising:
- a plurality of satellites; and
- a satellite constellation apparatus capable of communicating with the plurality of satellites,
- wherein the satellite constellation apparatus includes a traffic control communication control unit configured to predict a functional link through the plurality of satellites at a time point later than the present time point by a predetermined time based on trajectories of the plurality of satellites and control switching of transmission destinations of communication data transmitted and received by the satellites so that communication is performed by using the predicted functional link before a functional link through the plurality of satellites at the present time point is disconnected at the time point later by the predetermined time.

(Supplementary Note 6)

The satellite constellation system according to Supplementary note 5, wherein the traffic control communication control unit controls, separately for each of C-plane and U-plane, switching of transmission destinations of communication data transmitted and received by the plurality of satellites.

(Supplementary Note 7)

The satellite constellation system according to Supplementary note 5 or 6, wherein the traffic control communication control unit predicts a shortest-delay link having a shortest communication delay among functional links through the plurality of satellites at the time point later by the predetermined time.

(Supplementary Note 8)

The satellite constellation system according to Supplementary note 7, wherein
the traffic control communication control unit predicts, as a backup link, a link other than the shortest-delay link among functional links through the plurality of satellites at the time point later by the predetermined time,
the satellite constellation apparatus transmits the backup link to the plurality of satellites in advance, and
one of the satellites includes a satellite communication control unit configured to switch transmission destinations of transmitted and received communication data so that communication is performed by using the backup link when a link with another one of the satellites is disconnected.

(Supplementary Note 9)

A method by which a satellite constellation apparatus capable of communicating with a plurality of satellites predicts a functional link through the plurality of satellites at a time point later than the present time point by a predetermined time based on trajectories of the plurality of satellites and controls switching of transmission destinations of communication data transmitted and received by the satellites so that communication is performed by using the predicted functional link before a functional link through the plurality of satellites at the present time point is disconnected at the time point later by the predetermined time.

(Supplementary Note 10)

The method according to Supplementary note 9, wherein the satellite constellation apparatus controls, separately for each of C-plane and U-plane, switching of transmission destinations of communication data transmitted and received by the plurality of satellites.

(Supplementary Note 11)

The method according to Supplementary note 9 or 10, wherein the satellite constellation apparatus predicts a shortest-delay link having a shortest communication delay among functional links through the plurality of satellites at the time point later by the predetermined time.

(Supplementary Note 12)

The method according to Supplementary note 11, wherein the satellite constellation apparatus
predicts, as a backup link, a link other than the shortest-delay link among functional links through the plurality of satellites at the time point later by the predetermined time, and
transmits the backup link to the plurality of satellites in advance.

(Supplementary Note 13)

A non-transitory computer-readable medium storing a program configured to cause a satellite constellation apparatus capable of communicating with a plurality of satellites to execute processing of predicting a functional link through the plurality of satellites at a time point later than the present time point by a predetermined time based on trajectories of the plurality of satellites and controlling switching of transmission destinations of communication data transmitted and received by the satellites so that communication is performed by using the predicted functional link before a functional link through the plurality of satellites at the present time point is disconnected at the time point later by the predetermined time.

(Supplementary Note 14)

The non-transitory computer-readable medium according to Supplementary note 13, the program being further configured to cause the satellite constellation apparatus to execute processing of controlling, separately for each of C-plane and U-plane, switching of transmission destinations of communication data transmitted and received by the plurality of satellites.

(Supplementary Note 15)

The non-transitory computer-readable medium according to Supplementary note 13 or 14, the program being further configured to cause the satellite constellation apparatus to execute processing of predicting a shortest-delay link having a shortest communication delay among functional links through the plurality of satellites at the time point later by the predetermined time.

(Supplementary Note 16)

The non-transitory computer-readable medium according to Supplementary note 15, the program being further configured to cause the satellite constellation apparatus to execute:
processing of predicting, as a backup link, a link other than the shortest-delay link among functional links through the plurality of satellites at the time point later by the predetermined time; and
processing of transmitting the backup link to the plurality of satellites in advance.

What is claimed is:

1. A satellite constellation apparatus capable of communicating with a plurality of satellites, the satellite constellation apparatus comprising a traffic control communication control unit,
wherein the traffic control communication unit is configured to:
predict a functional link through the plurality of satellites at a time point later than a present time point by a predetermined time based on trajectories of the plurality of satellites; and
control switching of transmission destinations of communication data transmitted and
received by the satellites so that communication is performed by using the predicted functional link before the functional link through the plurality of satellites at a present time point is disconnected at the time point later by the predetermined time,
wherein the traffic control communication control unit predicts,
as a backup link,
a link other than a shortest-delay link among functional links through the plurality of satellites at the time point later by the predetermined time, and
wherein the satellite constellation apparatus transmits the backup link to the plurality of satellites in advance.

2. The satellite constellation apparatus according to claim 1, wherein the traffic control communication control unit controls, separately for each of C-plane and U-plane, switching of transmission destinations of communication data transmitted and received by the plurality of satellites.

3. The satellite constellation apparatus according to claim 1, wherein
the traffic control communication control unit predicts, as the backup link, a link other than the shortest-delay link among functional links through the plurality of satellites at the time point later by the predetermined time, and
the satellite constellation apparatus transmits the backup link to the plurality of satellites in advance.

4. A satellite constellation system comprising:
a plurality of satellites; and
a satellite constellation apparatus capable of communicating with the plurality of satellites,
wherein the satellite constellation apparatus includes a traffic control communication control unit,
wherein the traffic communication control unit is configured to;
predict a functional link through the plurality of satellites at a time point later than a present time point by a predetermined time based on trajectories of the plurality of satellites; and
control switching of transmission destinations of communication data transmitted and
received by the satellites so that communication is performed by using the predicted functional link before a functional link through the plurality of satellites at the present time point is disconnected at the time point later by the predetermined time,
wherein the traffic control communication control unit predicts,
as a backup link,
a link other than a shortest-delay link among functional links through the plurality of satellites at the time point later by the predetermined time, and
wherein the satellite constellation apparatus transmits the backup link to the plurality of satellites in advance.

5. The satellite constellation system according to claim 4, wherein the traffic control communication control unit controls, separately for each of C-plane and U-plane, switching of transmission destinations of communication data transmitted and received by the plurality of satellites.

6. The satellite constellation system according to claim 4, wherein the traffic control communication control unit predicts the shortest-delay link having a shortest communication delay among functional links through the plurality of satellites at the time point later by the predetermined time.

7. The satellite constellation system according to claim 6, wherein
the traffic control communication control unit predicts, as a backup link, a link other than the shortest-delay link among functional links through the plurality of satellites at the time point later by the predetermined time,
the satellite constellation apparatus transmits the backup link to the plurality of satellites in advance, and
one of the satellites includes a satellite communication control unit configured to switch transmission destinations of transmitted and received communication data so that communication is performed by using the backup link when a link with another one of the satellites is disconnected.

8. A method performed by which a satellite constellation apparatus capable of communicating with a plurality of satellites,
wherein the method comprises:
predicting a functional link through the plurality of satellites at a time point later than a present time point by a predetermined time based on trajectories of the plurality of satellites; and
controlling switching of transmission destinations of communication data transmitted and
received by the satellites so that communication is performed by using the predicted functional link before a functional link through the plurality of satellites at the present time point is disconnected at the time point later by a predetermined time,
wherein predicting the functional link comprises predicting,
as a backup link,
a link other than a shortest-delay link among functional links through the plurality of satellites at the time point later by the predetermined time, and
wherein the method further comprises transmitting the backup link to the plurality of satellites in advance.

9. The method according to claim 8, further comprising:
the satellite constellation apparatus controls,
controlling, separately for each of C-plane and U-plane, switching of transmission destinations of communication data transmitted and received by the plurality of satellites.

10. The method according to claim 8, further comprising:
wherein the satellite constellation apparatus predicts a
predicting the shortest-delay link having a shortest communication delay among functional links through the plurality of satellites at the time point later by the predetermined time.

11. A non-transitory computer-readable medium storing a program configured to cause executable by a satellite constellation apparatus capable of communicating with a plurality of satellites to execute processing comprising:
predicting a functional link through the plurality of satellites at a time point later than a present time point by a predetermined time based on trajectories of the plurality of satellites; and
controlling switching of transmission destinations of communication data transmitted and
received by the satellites so that communication is performed by using the predicted functional link before a functional link through the plurality of satellites at the present time point is disconnected at the time point later by the predetermined time,
wherein predicting the functional link comprises predicting,
as a backup link,
a link other than a shortest-delay link among functional links through the plurality of satellites at the time point later by the predetermined time, and
wherein the processing further comprises transmitting the backup link to the plurality of satellites in advance.

12. The non-transitory computer-readable medium according to claim 11, wherein the processing further comprises: the program being further configured to cause the satellite constellation apparatus to execute processing of controlling, separately for each of C-plane and U-plane, switching of transmission destinations of communication data transmitted and received by the plurality of satellites.

13. The non-transitory computer-readable medium according to claim 11, wherein the processing further comprises:

the program being further configured to cause the satellite constellation apparatus to execute processing of predicting the shortest-delay link having a shortest communication delay among functional links through the plurality of satellites at the time point later by the predetermined time.

* * * * *